C. A. RUSSELL.
VEHICLE WHEEL.
APPLICATION FILED SEPT. 27, 1910.
1,038,661.
Patented Sept. 17, 1912.
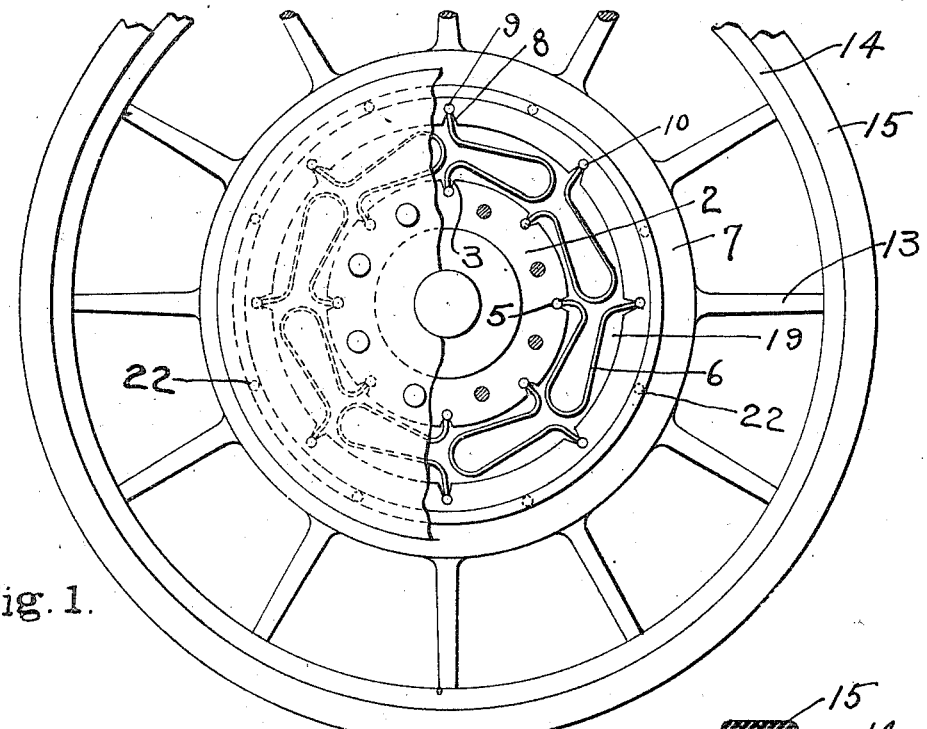
Fig. 1.
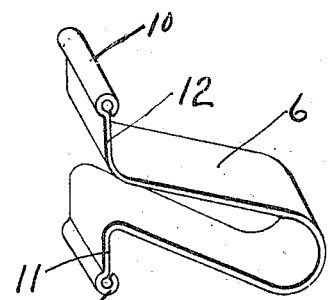
Fig. 3.
Fig. 5
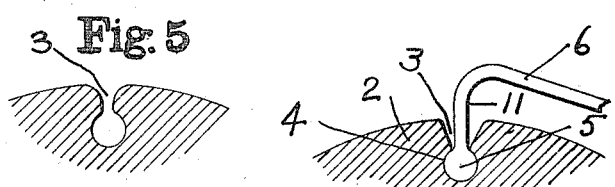
Fig. 4.
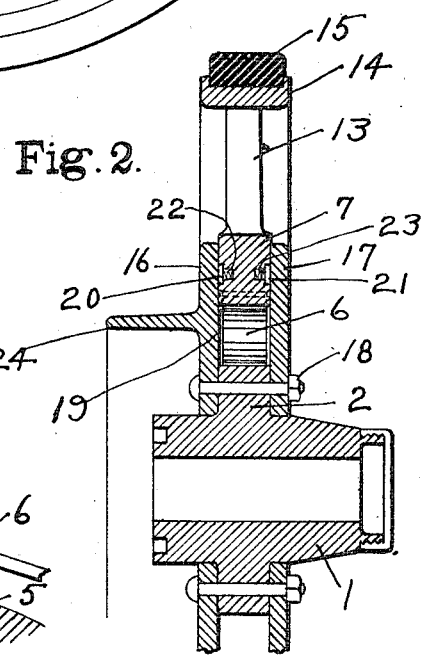
Fig. 2.
WITNESSES:
E. I. Ogden
Chas. W. Eddy.
INVENTOR
Charles A. Russell.
BY
Howard E. Barlow
ATTORNEY

UNITED STATES PATENT OFFICE.

CHARLES A. RUSSELL, OF PROVIDENCE, RHODE ISLAND.

VEHICLE-WHEEL.

1,038,661.   Specification of Letters Patent.   Patented Sept. 17, 1912.

Application filed September 27, 1910. Serial No. 584,066.

*To all whom it may concern:*

Be it known that I, CHARLES A. RUSSELL, a citizen of the United States, residing at the city of Providence, in the county of Providence and State of Rhode Island, have invented certain new and useful Improvements in Vehicle-Wheels, of which the following is a specification, reference being had therein to the accompanying drawing.

This invention relates to new and useful improvements in vehicle wheels, its object being to provide means whereby all shocks and jars are absorbed through the medium of metallic springs inserted at the hub, thereby preventing these shocks from being transmitted to the axle and to the body of the vehicle, obviating in a measure the necessity of using pneumatic tires for this purpose.

A further object of the invention is to so construct the springs and attach the same to the members of the wheel hub that they can be very readily removed and replaced for inspection and repairs.

A further object of the invention is to so shape the springs and attach their ends to the members of the wheel that the whole spring is permitted to work at every point in the rotation of the wheel, without bringing an excessive strain on any particular part of the spring.

Still a further object of this invention is to provide means for stiffening and firmly supporting the wheel laterally against yielding to any side thrust and at the same time provide a dust-tight casing to protect the springs.

With these and other objects in view, the invention consists of certain novel features of construction, as will be more fully described and particularly pointed out in the appended claims.

In the accompanying drawings: Figure 1— is a side elevation of my improved vehicle wheel showing a portion of one of the guide plates removed to better show the springs mounted therein. Fig. 2— is a central sectional edge view of a portion of the wheel. Fig. 3— is an enlarged view of one of the springs, slightly modified. Fig. 4— is an enlarged view illustrating the manner of holding the ends of the springs whereby every portion of the spring is permitted to yield as the wheel revolves. Fig. 5— illustrates another form of the open-mouthed slot in which the resilient necks are retained.

Referring to the drawings, 1 designates the hub member of the wheel which may be made in any desired form to fit the axle of any vehicle, said hub being preferably provided with an annular flange 2, and said flange provided at intervals around its periphery with slots 3 preferably having tapered or open mouths see Fig. 4. The inner end of each slot is preferably enlarged into a circular recess 4 for receiving and retaining the correspondingly shaped inner end 5 of each spring 6 presently described. An outer concentric ring 7 is also provided on its inner surface with a corresponding set of slots 8 and recesses 9 for the reception of the opposite ends 10 of the said springs. These springs 6 are preferably constructed of thin flat stock of considerable width to facilitate their constant bending without the tendency to break, each of which are formed into substantially a U-shape having its ends turned outward as at 11 and 12, said ends being preferably provided with enlarged cylindrically shaped portions 5 and 10 respectively, but these ends may be made in any convenient shape whereby they may be readily retained. Corresponding recesses are formed in the bottom of slots 3 and 8 for the reception of said ends. When made in cylindrical shape the ends 5 and 10 may be constructed by curling the stock as suggested in Fig. 3, or a solid cylindrical shape may be obtained as suggested in Fig. 4 by upsetting the ends of the stock or otherwise.

The essential feature in the construction of this spring is the comparatively long outwardly extending flexible neck portions 11 and 12 which lends to the spring long life, and great resiliency. The mouths of the slots 3 and 8 in the ring and hub may be formed flaring if desired to prevent the possibility of breaking the spring by constant bending at the neck, which might be the case if these ends were held rigidly in the slots of their respective members. Any desired number of spokes 13 may be connected to or interposed between the ring 7 and the outer rim 14. On this rim a tire 15 is secured which is preferably made of solid rubber.

In order to assist the springs 6 in supporting the rim against any lateral motion, and at the same time permitting a free vertical motion of the hub while riding on said springs, I have provided two circular plates 16 and 17, both of which are secured to the hub flange 2 by bolts 18, or other convenient means, said plate being wide enough to cover the space 19 in which the springs are located and to engage the face on each side of ring 7 in the manner best illustrated in Fig. 2.

In order to make this ring a sliding fit between these plates and yet render the joint between them dust-proof I have provided a pair of packing rings 20 and 21 held in grooves in the face on either side of the hub 7 said rings being pressed outward against the inner faces of the plates 16 and 17 by the small springs 22 and 23, which may be located at intervals around the hub ring 7, thus preventing the dust from entering the space in which the springs are located. A brake drum 24 may be connected to the plate 16 if desired.

By my improved construction of springs it will be noted that if for any reason one of the springs should become broken it is only necessary to remove the outer plate 17, withdraw the broken spring with a pair of pliers and slide a new one into position, the ends readily entering the recess made to receive them, the plate is then returned to its position and the wheel is at once restored to its normal efficiency.

I do not wish to be restricted to forming the springs with cylindrical ends, neither do I restrict myself to forming flaring mouthed slots and loosely mounting the spring ends in their respective recesses as the ends of the springs may be of any form and held in any desired manner without departing from the spirit and scope of my invention the essential feature of which is the providing of substantially U-shaped springs with comparatively long resilient out-turned neck portions, the ends of which are retained one in the ring and the other in the hub members.

By employing elongated springs with the arms in radial alinement it has been found in practice that when the wheel goes in the forward direction the resiliency of the full length of the very long flat spring is obtained, the ends being loosely held in the different parts of the wheel so that no strain comes on any one point. The spring is also arranged so that when the wheel runs in the other direction, or when being backed, the loop rests against the hub and supports the same against the very heavy strain which is often applied, particularly to a motor vehicle when backing.

I claim:

1. A wheel comprising a hub, a hub ring encircling the same, a plurality of springs interposed between said hub and said hub ring, said springs being each formed of an elongated U-shaped body having arms of unequal length, the ends of said arms being connected to the hub and hub ring respectively, and approximately in radial alinement with the center of the hub, whereby the shorter arms of each spring will lie close to the hub when the wheel is rotating in one direction, and will contact with said hub when rotation of the wheel is reversed.

2. A wheel comprising a hub, a hub ring encircling the same, a plurality of springs interposed between said hub and said hub ring, said springs being each formed of an elongated U-shaped body having arms of unequal length, said hub and hub rings being provided with recesses in which the ends of the springs are pivotally mounted, said ends being approximately in radial alinement with the center of the hub, and a rim supported by said hub ring.

3. A wheel comprising a hub, a hub ring encircling the same, a plurality of elongated U-shaped springs interposed between said hub and said hub ring, and having their opposite ends loosely connected to said hub and hub ring respectively, the short arms of said springs lying close to the hub when the wheel is rotated in one direction and contacting with the hub when the rotation of the wheel is reversed, and supporting side plates engaging and overlapping the hub and the hub ring to permit vertical movement and yet prevent lateral movement of the hub ring and springs relative to the hub.

In testimony whereof I affix my signature in presence of two witnesses.

CHARLES A. RUSSELL.

Witnesses:
HOWARD E. BARLOW,
E. I. OGDEN.